United States Patent Office 3,266,818
Patented August 16, 1966

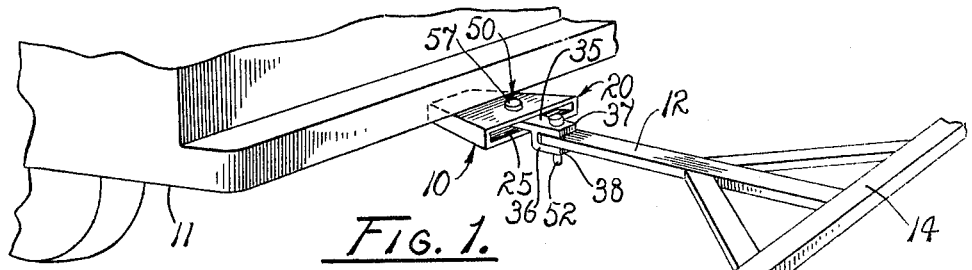
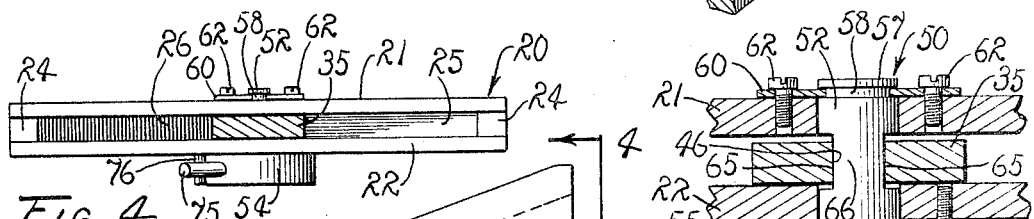
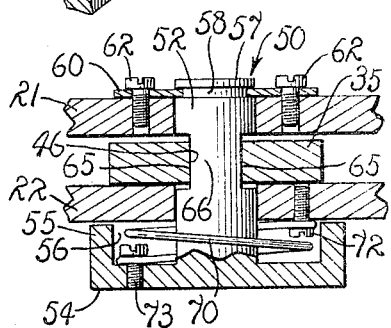
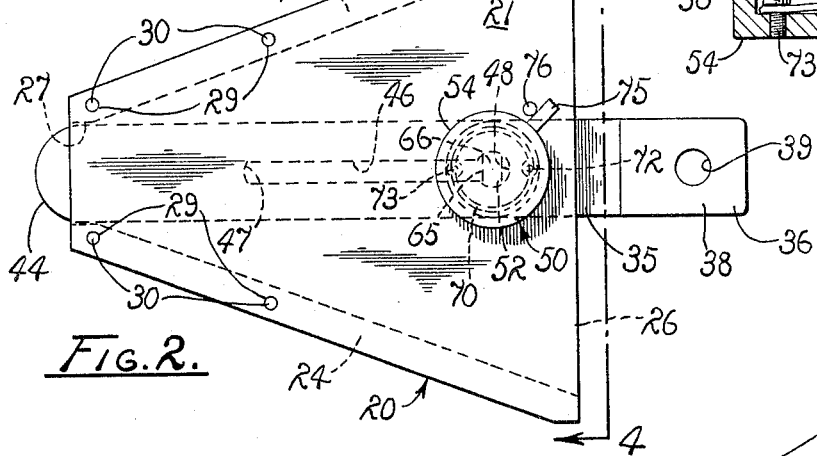
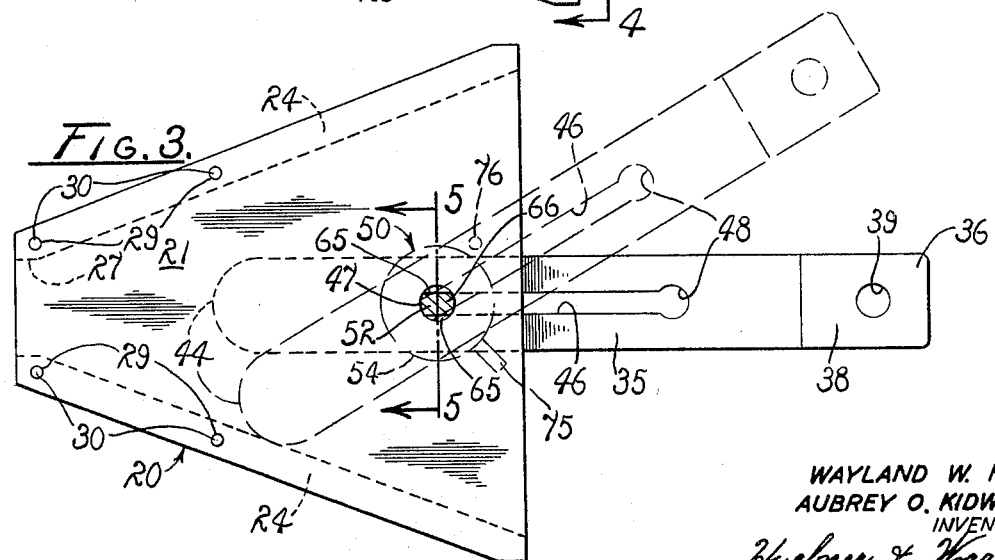

3,266,818
VEHICLE COUPLING DEVICE
Wayland W. Hill, P.O. Box 168, Earlimart, Calif., and Aubrey O. Kidwell, Rte. 1, Box 172, Earlimart, Calif.
Filed Sept. 28, 1964, Ser. No. 399,496
9 Claims. (Cl. 280—478)

The present invention relates to a vehicle coupling device for connection between draft and trailing vehicles and more particularly to such a device which enables such connection to be completed without precise relative positioning of the vehicles and which is automatically locked in the desired aligned relation between the vehicles prior to joint forward movement of the vehicles.

When connecting draft and trailing vehicles the draft tongue of the latter must usually be manually positioned. This operation is extremely difficult when the trailing vehicle is heavy or loaded. There have been previous attempts to alleviate this problem by providing various coupling and hitch devices utilizing relatively movable components and axially slidable pins which because of their range of movement protrude from the coupling in positions where they are easily damaged. Such pins are receivable in corresponding bores in the relatively movable components of the coupling. The pins are either manually positionable or are spring-biased for automatic insertion into a bore when aligned therewith. However, with the high shearing forces imposed on the pins during operation of the vehicles, the pins frequently become bent, making removal difficult and re-entry into the bores virtually impossible. Other structures of the prior art provide large tapered coupler members which are receivable in correspondingly shaped sockets or housings which require a plurality of locking pins to maintain the coupler and the socket in assembly. Because of their bulk, such structures are difficult to mount on passenger vehicles and the like and are subject to the above described pin damage.

Therefore, it is an object of the present invention to provide an improved dependable coupling device for connection between draft and trailing vehicles.

Another object is to provide such an improved vehicle coupling device which obviates precise positioning of the vehicles during the connecting operation.

Another object is to provide a vehicle coupling device wherein the connection between the vehicles can be completed prior to any combined forward movement thereof.

Another object is to provide a vehicle coupling device of the character described having a latch mechanism which is not easily damaged by external impact forces.

Another object is to provide such a vehicle coupling device which presents a minimum of protuberance from the coupling.

Another object is to provide a vehicle coupling device providing such a latch mechanism, the operation of which is not adversely affected by the bending forces imposed thereon during operation of the vehicles.

Another object is to provide a vehicle coupling device which is capable of being inconspicuously mounted beneath the draft vehicle.

Another object is to provide a vehicle coupling device which is of simple, compact construction and which is virtually indestructible.

Other objects and advantages of the present invention will become more fully apparent in the subsequent description in the specification.

In the drawing:

FIG. 1 is a perspective view of a vehicle coupling device shown mounted on the rear end of a draft vehicle in connecting relation to a trailing vehicle.

FIG. 2 is a somewhat enlarged bottom plan view of the coupling device of FIG. 1, removed from the draft vehicle, and showing a drawbar portion thereof disposed in retracted position.

FIG. 3 is a bottom plan view of the vehicle coupling device showing the drawbar in extended connecting position in full lines and a transversely disposed connecting position in dashed lines.

FIG. 4 is a transverse vertical section through the coupling device of the present invention taken on line 4—4 of FIG. 2.

FIG. 5 is a somewhat enlarged fragmentary vertical section through the drawbar locking mechanism taken on line 5—5 of FIG. 3.

With particular reference to the drawing, a vehicle coupling device embodying the principles of the present invention is generally indicated by the reference numeral 10. As shown in FIG. 1, the coupling device is mounted beneath the rear bumper of a draft vehicle 11 such as a pick-up truck, passenger automobile, tractor, or the like for connecting the draft vehicle to the draft tongue 12 of a trailing vehicle, fragmentarily indicated at 14.

The vehicle coupling device 10 includes a socket or housing member 20 having opposite substantially regularly trapezoidal upper and lower wall portions 21 and 22, respectively. The upper and lower walls are interconnected in spaced substantially parallel relation by opposite side walls 24. The walls of the housing define a tapered chamber 25 therein having a relatively wide rearwardly opening mouth portion 26 with the side walls converging forwardly therefrom to terminate in a relatively narrow forwardly opening constricted end portion 27. A plurality of holes 29 are formed through the upper and lower walls 21 and 22 and through the side walls 24 to receive a plurality of mounting bolts 30 therethrough for rigidly securing the coupling device to the draft vehicle 11, as shown in FIG. 1.

An elongated substantially rectangular drawbar 35 is slidably received within the chamber 25 of the housing 20. The drawbar includes a forked or bifurcated connecting end 36 having a pair of vertically spaced plates 37 and 38 which provide aligned vertical apertures or bores 39. The outer end 36 of the drawbar thereby provides connection for the trailing vehicle 14 by inserting the draft tongue 12 thereof between the plates as shown in FIG. 1. A drawbar pin 42 is inserted through the bores 39 in the end of the drawbar and through an aligned aperture in the tongue to complete the connection.

The drawbar 35 includes an arcuate inner end 44 which, as best shown in FIG. 2, is extended through the constricted end 27 of the chamber 25 of the housing 20 in intimate engagement with the opposite ends of the side walls 24. An elongated keyway or slot 46 is formed in the drawbar intermediate its ends in longitudinally extended relation. The slot has an inner end 47 and an enlarged substantially circular outer end 48.

A drawbar locking mechanism 50 is mounted adjacent to the mouth portion 26 of the chamber 25 in constraining relation to the drawbar to permit limited longitudinal and transverse swinging movement of the drawbar relative to the housing 20. The locking mechanism provides an elongated pin 52 extended through the upper and lower walls 21 and 22 of the housing 20 and through the outer circular end 48 of the slot 46 in the drawbar with the drawbar disposed in its retracted position of FIG. 2. The pin includes a lower head or cap portion 54 having an outer annular flange 55 which defines an annular recess 56 therein about the pin. The pin further includes an upper end 57 extended a short distance outwardly from the upper wall 21 of the housing and provides an annular groove 58 therein. A substantially flat U-shaped keeper plate 60 is received within the groove 58 and is rigidly mounted on the upper wall of the housing by a plurality of bolts 62 screw-threadably received therein axially to constrain the pin in the housing but to permit rotary movement thereof.

The pin 52 also includes a pair of opposite flat surfaces 65 intermediate its ends which provide a substantially rectangular central key portion 66 of a width slidably to be received within the elongated slot 46 in the drawbar 35. A torsion spring 70 is disposed within the recess 56 of the cap and is connected at one of its ends to the lower wall 22 of the housing by a cap screw 72 and is connected at its opposite end to the cap 54 by a cap screw 73. The torsion spring tends to rotate the cap and pin in a counterclockwise direction, as viewed in FIGS. 2 and 3. Such rotation is limited by a stop dog 75 radially outwardly extended from the cap 54 engaging a rigid post 76 mounted on the lower wall of the housing in interfering relation to the stop dog 75. In such position the rectangular key portion 66 of the drawbar pin 52 is disposed transversely of the slot 46, as shown in FIG. 2, so that the drawbar 35 is held in the retracted position.

Operation

The operation of the described embodiment of the subject invention is believed to be clearly apparent and is briefly summarized at this point. When it is desired to connect the trailing vehicle 14 with the draft vehicle 11 having the coupling device 10 of the present invention mounted thereon, as in FIG. 1, the cap 54 of the drawbar locking mechanism 50 is rotated in a clockwise direction, as viewed in FIG. 2. Such rotation rotates the rectangular key portion 66 of the pin 52 from its locking position of FIG. 2 to the position of FIG. 3 aligned with the elongated slot 46 in the drawbar 35. Such rotation is permitted by the position of the pin 52 within the circular end 48 of the slot 46.

With the key portion 66 of the pin 52 aligned with the slot 46, the drawbar 35 is free to be longitudinally extended outwardly from the mouth portion 26 of the chamber 25 of the housing 20. Such outward longitudinal movement of the drawbar is permitted until the key portion of the pin abuts the inner end 47 of the slot 46, as shown in FIG. 3. It is noted that upon outward extension of the drawbar, the drawbar will be rotated along with the cap 54 and pin 52 under the urging of the torsion spring 70. Upon full extension of the drawbar, it will thereby assume the transversely disposed dashed line position of FIG. 3 which position is determined by abutment of the inner end 44 of the drawbar with the side wall 24 of the housing. Such spring force is, however, easily overcome by manipulation of the drawbar which may be swung to an opposite transversely disposed position until abutment of the inner end of the drawbar with the opposite side wall 24 of the housing.

The draft vehicle 11 is then positioned forwardly of the trailing vehicle 14 in close proximity thereto. Such positioning is not critical in that the drawbar can be manipulated to any point between its outer position as shown in FIG. 3 and its inner retracted position of FIG. 2. The drawbar may also be transversely swung between the dashed line position of FIG. 3 and its above described opposite transversely disposed position in any longitudinal position of the drawbar. It will be noted that the maximum transverse swinging movement of the drawbar is accomplished when the drawbar is fully longitudinally extended from the housing. Upon inwardly positioning the drawbar, the arc of transverse movement is decreased in corresponding relation to the reduction in transverse spacing of the converging side walls 24 of the housing 20 engaged thereby. As a result of the varied extended adjustable positions attainable by the drawbar, it thereby provides sufficient clearance between the vehicles to provide ample space for the operators' safe and convenient connection of the vehicles.

The tongue 12 of the trailing vehicle 14 is connected by the pin 42 to the drawbar 35 which concludes all manipulation required by the operator in completing the connection. The remaining operations necessary to secure the drawbar in the towing position of FIG. 2 are completely automatic. In such operation, the draft vehicle 11 is backed slowly toward the trailing vehicle to slide the drawbar forwardly within the housing 20. During such sliding movement of the drawbar, the inner end 44 thereof slides against the side wall 24 of the housing automatically to straighten the drawbar within the housing in precisely aligned relation between the vehicles. When the inner end of the drawbar is shoved through the constricted end 27 of the chamber 25 of the housing, the drawbar pin 52 is concurrently received within the circular end 48 of the slot 46 in the drawbar. The pin 52 and the cap 54 are then free automatically to rotate the key portion 66 of the pin to the locking position of FIG. 2 by the urging of the torsion spring 70 until the dog 75 abuts the post 76 on the housing.

The coupling device of the present invention is also readily adapted to permit quick and easy disconnection of the draft and trailing vehicles which frequently is difficult to accomplish with conventional coupling devices. Frequently, the pin connecting the draft tongue of the trailing vehicle with the draft vehicle becomes bent and tightly wedged within its bore due to the shearing forces imposed thereon during operation of the vehicles. In conventional drawbars, the pin is usually freed by further manipulation of the draft vehicle or manually maneuvering the trailing vehicle. However, with the coupling device of the present invention, such loosening of the pin 42 is easily accomplished by merely rotating the pin cap 54 in the above described manner to free the drawbar 35 within the housing 20. The drawbar is then permitted free longitudinal movement to seek its own position within the sleeve so that there is no strain or shearing force imposed against the connecting pin 42 which is then easily withdrawn.

From the foregoing, it is readily apparent that the structure of the present invention has provided an improved vehicle coupling device which enables drawing and trailing vehicles to be connected with a minimum of manipulation by the operator. The single drawbar locking mechanism 50 permits both longitudinal sliding movement of the drawbar and transverse swinging movement about a single connecting pin which is maintained in a fixed area of operation and need not be removed at any time. The locking mechanism enables the connection to be completed automatically by accurately guiding and constraining the drawbar to the desired precisely aligned position between the vehicles. The structure is simple, compact, and virtually trouble-free.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A coupling device comprising a housing having a compartment therein; coupler means having a connector end slidably disposed within the compartment of the housing for longitudinal and transverse movement between a retracted position with the connector end disposed outwardly adjacent to the compartment and a connecting position with the connector end extended outwardly from the housing in spaced relation to said compartment; and an axially constrained latch member journaled for rotation in the housing in a fixed area of operation interconnecting said coupler means and the housing and having a locking portion to constrain the coupler means in the compartment against longitudinal and transverse movement when said coupler means is in said retracted position and being rotatable to a position permitting longitudinal sliding movement of the coupler means for movement to said connecting position while permitting transverse swinging movement of the coupler means about the latch member.

2. A coupling device comprising a housing having a compartment therein providing a mouth portion and an opposite constricted portion; coupler means slidably disposed with the compartment of the housing having a connector end and an opposite end, said coupler means being movable within the campartment between a retracted position with the connector end disposed outwardly from the housing adjacent to the mouth of the compartment with the opposite end intimately received within the constricted portion of the compartment, and a connecting position with the connector end of the coupler means extended outwardly from the housing in spaced relation to said mouth portion of the compartment and with the opposite end disposed within the compartment inwardly from said constricted portion; and an axially constrained latch member journaled for rotation in the housing in a fixed area of operation interconnecting said coupler means and the housing and combining with said constricted portion of the compartment to lock the coupler means in the compartment against longitudinal and transverse movement when said coupler means is in said retracted position and being rotatable to a position permitting longitudinal sliding movement of the coupler means for movement to said connecting position while permitting transverse swnging movement of the coupler means about the latch member.

3. A coupling device for connection between draft and trailing vehicles comprising a housing mounted on the draft vehicle having opposite open ends and a compartment therein providing a mouth portion at one end of the housing and a constricted portion at the opposite end of the housing; coupler means slidably disposed within the compartment of the housing having a connector end for connection to the trailing vehicle and an opposite end, said coupler means being movable within the compartment between a retracted position with the connector end disposed outwardly from the housing adjacent to the mouth of the compartment with the opposite end of the coupler means intimately received within the constricted portion of the compartment, and a connecting position with the connector end of the coupler means extended outwardly from the housing in spaced relation to said mouth portion of the compartment and with the opposite end of the coupler means disposed within the compartment inwardly from said constricted portion; and an axially constrained latch member journaled for rotation in the housing in a fixed area of operation interconnecting said coupler means and the housing and combining with said constricted portion of the compartment to lock the coupler means in the compartment against longitudinal and transverse movement when said coupler means is in said retracted position and being rotatable to a position permitting longitudinal sliding movement of the coupler means for movement to said connecting position while permitting transverse swinging movement of the coupler means about the latch member.

4. A coupling device for connection between draft and trailing vehicles comprising a housing mounted on the draft vehicle having opposite open ends and a compartment therein providing a mouth portion at one end of the housing and constricted portion at the opposite end of the housing; a coupler member slidably disposed within the compartment of the housing having a connector end for connection to the trailing vehicle and an opposite end, said coupler member including an elongated slot intermediate its ends and being movable within the compartment between a retracted position with the connector end diposed outwardly from the housing adjacent to the mouth of the compartment with the opposite end of the coupler member intimately received within the constricted portion of the compartment, and a connecting position with the connector end of the coupler member extended outwardly from the housing in spaced relation to said mouth portion of the compartment and with the opposite end of the coupler member disposed within the compartment inwardly from said constricted portion; and an axially constrained latch member journaled for rotation in the housing in a fixed area of operation through said slot in the coupler member interconnecting said coupler member and the housing and combining with said constricted portion of the compartment to lock the coupler member in the compartment against longitudinal and transverse movement when said coupler member is in said retracted position and being rotatable within the slot to a position permitting longitudinal sliding movement of the coupler member for movement to said connecting position while permitting transverse swinging movement of the coupler member about the latch member.

5. A coupling device for connection between draft and trailing vehicle comprising a housing mounted on the draft vehicle having opposite open ends and a compartment therein providing a mouth portion at one end of the housing and a constricted portion at the opposite end of the housing; an elongated drawbar slidably disposed within the compartment of the housing having a connector end for connection to the trailing vehicle and an opposite end, said drawbar including an elongated slot intermediate its ends providing a relatively narrow end and an enlarged circular end with the drawbar being movable within the compartment between a retracted position with the connector end disposed outwardly from the housing adjacent to the mouth of the compartment with the opposite end of the drawbar intimately received within the constricted portion of the compartment, and a connecting position with the connector end of the drawbar extended outwardly from the housing in spaced relation to said mouth portion of the compartment and with the opposite end of the dawbar disposed within the compartment inwardly from said constricted portion; and an axially constrained latch member having a constricted portion journaled for rotation in the housing in a fixed area of operation through said circular end of the slot in the drawbar interconnecting said drawbar and the housing and combining with said constricted portion of the compartment to lock the drawbar in the compartment against longitudinal and transverse movement when said drawbar is in said retracted position and being rotatable to a position whereby the constricted portion is receivable within the narrow portion of the slot to permit longitudinal sliding movement of the drawbar to said connecting position while concurrently permitting transverse swinging movement of the drawbar about the latch member.

6. The coupling device of claim 5 wherein the latch member provides a cylindrical periphery having an enlarged head end, an opposite end, and a pair of opposed flat surfaces intermediate the ends defining a substantially rectangular key portion positionable within the circular portion of the slot in transversely disposed locking relation to the narrow portion of the slot to preclude relative longitudinal sliding movement between the drawbar and the housing and being rotatable for alignment with the narrow portion of the slot to permit such sliding movement.

7. The coupling device of claim 6 wherein said head end of the latch member has an annular recess adjacent to the housing, biasing means disposed within the recess in interconnecting relation between the cap and the housing to urge said latch member toward said locking position, a dog on the cap, and stop means on the housing in interfering relation to said dog and engageable therewith to limit rotation of the latch member.

8. In a vehicle coupling device having a housing providing a compartment therein, an elongated drawbar slidably disposed within the compartment of the housing having an elongated longitudinally extended slot therein providing a relatively narrow end and an opposite enlarged circular end; a latch mechanism comprising an elongated axially constrained pin providing a constricted portion journaled for rotation in the housing in a fixed area of operation and extended through said circular end of the slot in the drawbar in transversely disposed blocking relation to the narrow end of the slot; and means for rotating the pin so as to align said constricted portion of the pin with said narrow end of the slot to permit longitudinal movement of the drawbar relative to the housing.

9. In a vehicle coupling device having a housing providing a compartment therein, an elongated drawbar slidably disposed within the compartment of the housing having an elongated longitudinally extended slot therein providing a relatively narrow end and an opposite enlarged circular end; a latch mechanism comprising an elongated axially constrained pin providing opposite ends and a pair of opposed flat surfaces intermediate the ends defining a substantially rectangular key portion journaled for rotation in the housing in a fixed area of operation and extended through said circular end of the slot in the drawbar with the key portion in transversely disposed blocking relation to the narrow end of the slot; means for rotating the pin so as to align said constricted portion of the pin with said narrow end of the slot to permit longitudinal movement of the drawbar relative to the housing; and biasing means interconnecting the pin and the housing rotatably urging said key portion into said blocking relation relative to the narrow end of the slot when the pin is disposed in said circular end of the slot.

References Cited by the Examiner

UNITED STATES PATENTS

| 2,820,649 | 1/1958 | Demarest | 280—478 |
| 2,973,971 | 3/1961 | Oddson | 280—478 |
| 3,093,395 | 6/1963 | Boutwell | 280—478 |
| 3,099,462 | 7/1963 | Lent | 280—478 |
| 3,126,210 | 3/1964 | Hill | 280—478 |
| 3,169,028 | 2/1965 | Scrivner | 280—478 |

LEO FRIAGLIA, *Primary Examiner.*